(No Model.)
P. G. FORSBERG.
AUTOMATIC STOP FOR CRACKER OVEN REELS.
No. 467,536. Patented Jan. 26, 1892.
3 Sheets—Sheet 2.
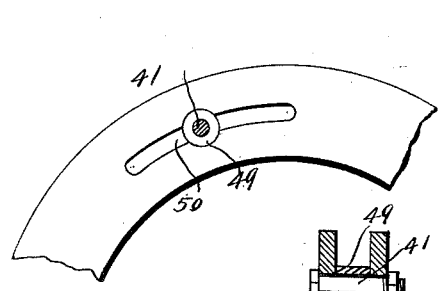
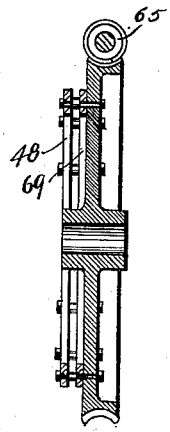
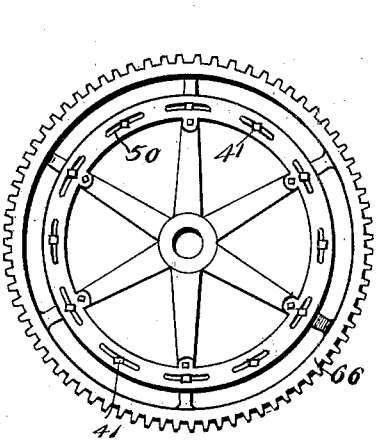
Fig. 8. Fig. 7. Fig. 6. Fig. 5.
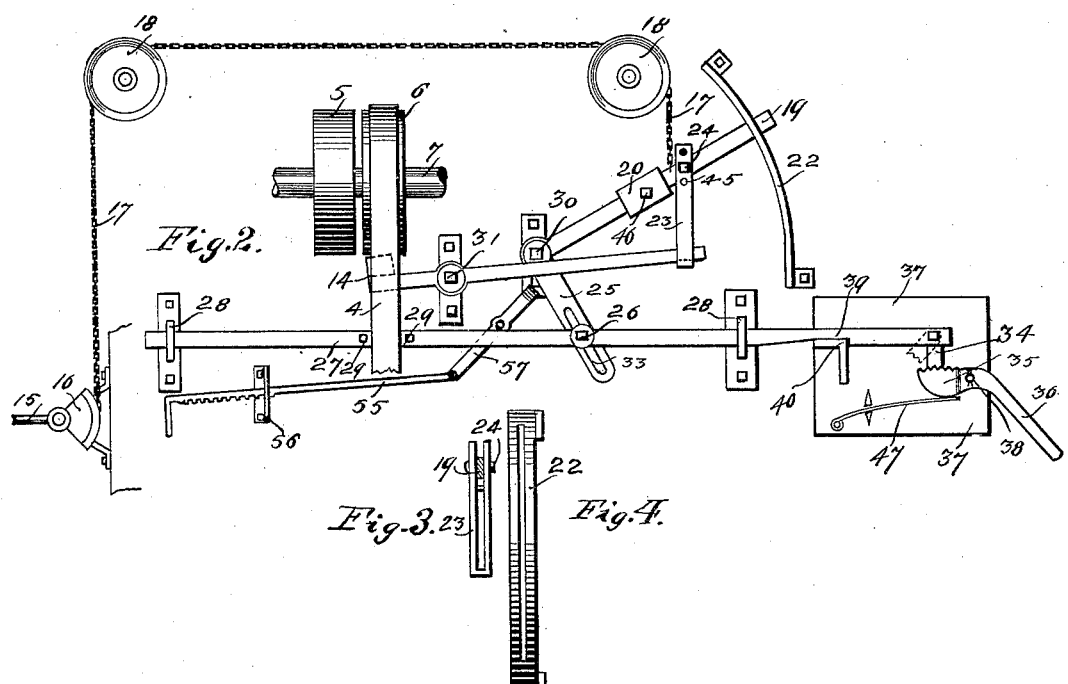
Fig. 2. Fig. 3. Fig. 4.
Witnesses:
C. E. Van Doren
Q. L. Hawley
Inventor:
Peter G. Forsberg
By Paul   Attys.

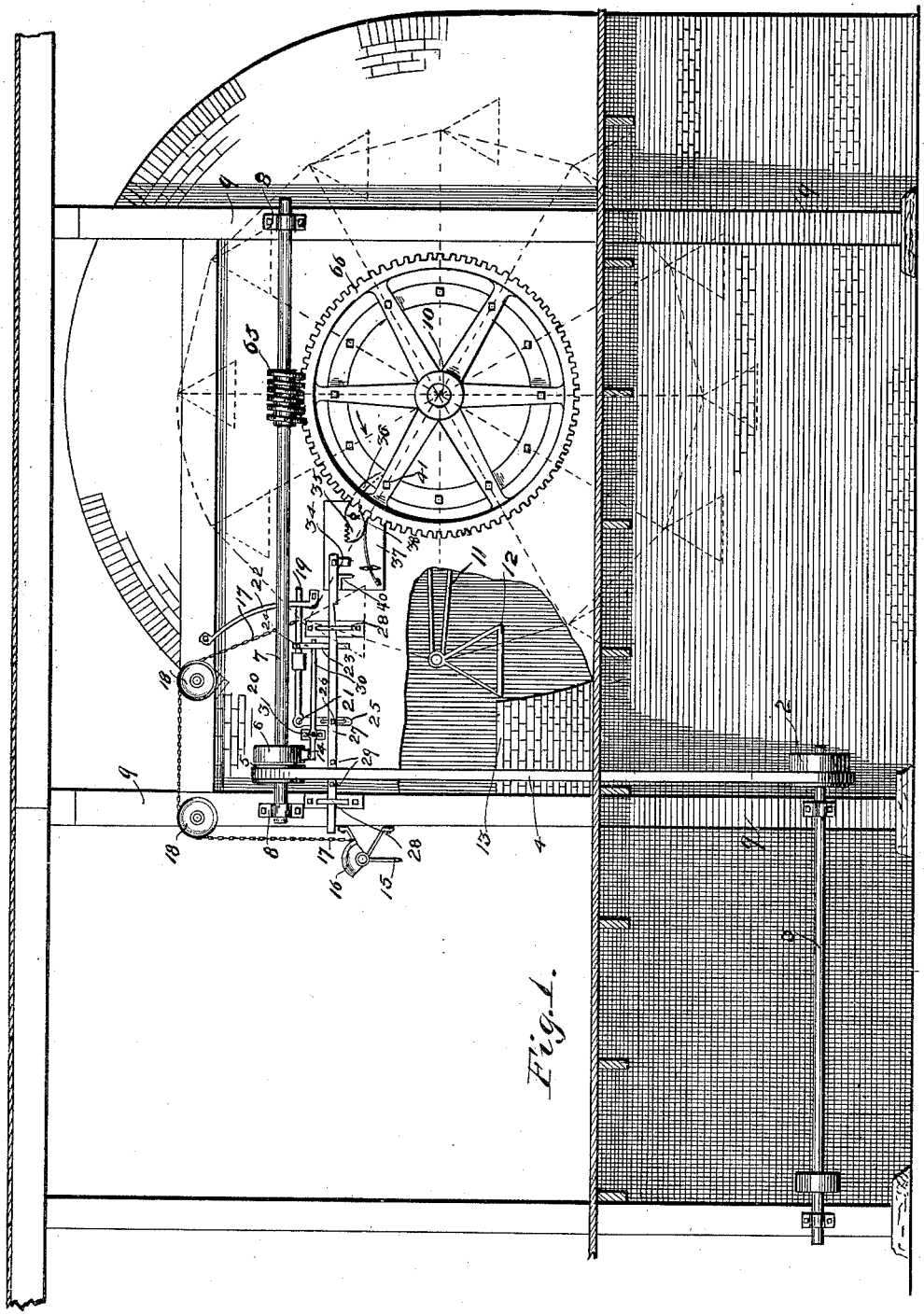

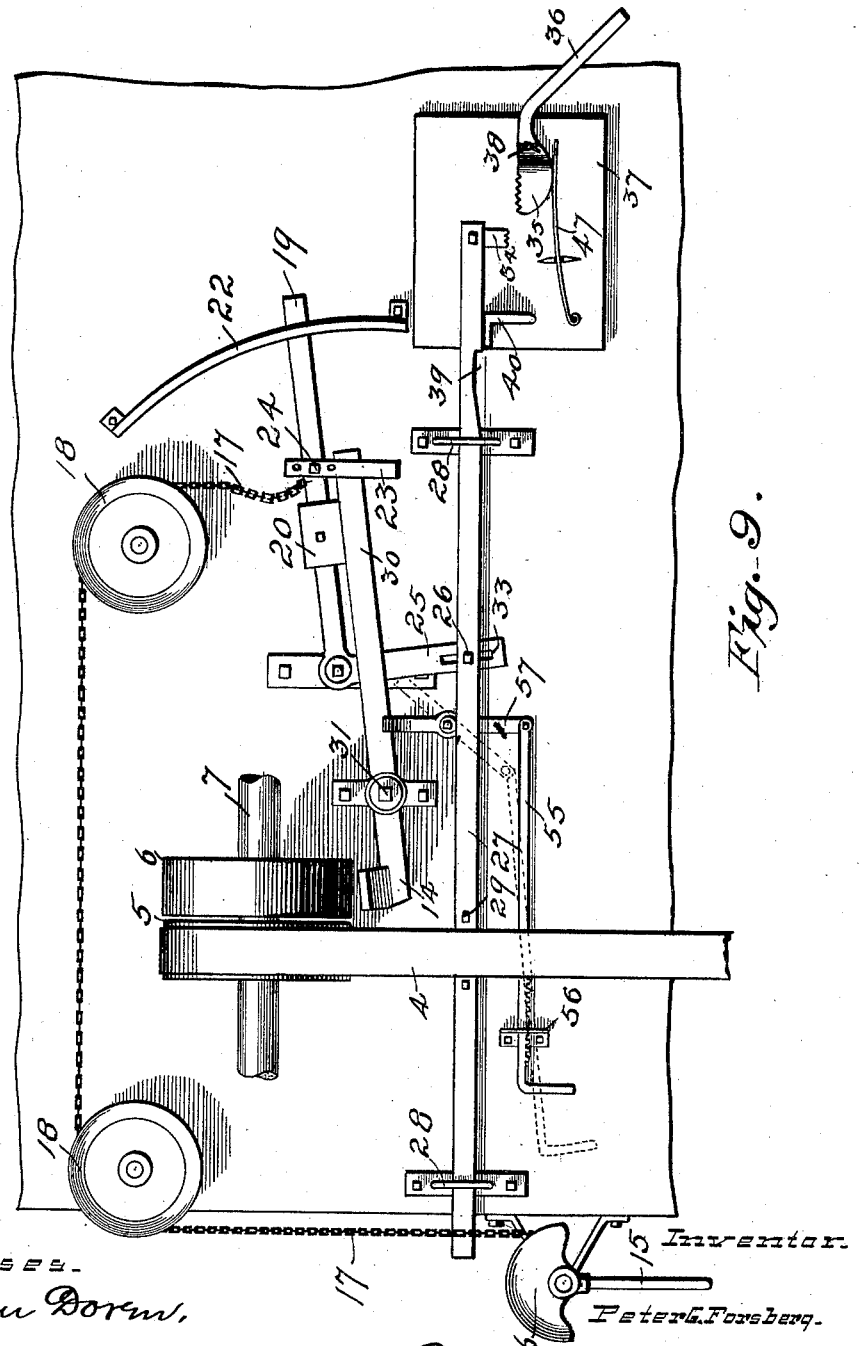

UNITED STATES PATENT OFFICE.

PETER G. FORSBERG, OF MINNEAPOLIS, MINNESOTA.

AUTOMATIC STOP FOR CRACKER-OVEN REELS.

SPECIFICATION forming part of Letters Patent No. 467,536, dated January 26, 1892.

Application filed December 27, 1890. Serial No. 375,927. (No model.)

*To all whom it may concern:*

Be it known that I, PETER G. FORSBERG, of Minneapolis, in the county of Hennepin and State of Minnesota, have invented certain Improvements in Automatic Stops for Cracker-Oven Reels, of which the following is a specification.

My invention relates to means whereby the baking-pan or shelf-reel within the cracker-oven may be automatically stopped as each shelf comes to a level with the floor of the doorway provided in the oven-wall, and through which the dough is placed upon the shelves and taken out therefrom.

The object of my invention is to provide a slow-acting automatic stop and means provided in connection therewith whereby the same may be regulated and the shelves, as they are successively brought toward the oven-door, stopped in exactly the same positions.

My invention consists in a friction-brake adapted to engage the driving-pulley upon the worm-gear shaft, a belt-shifting rod adapted to engage a pivoted tripping-lever adapted to be operated periodically by the revolution of the worm-gear upon the shaft of the oven-reel, and a weight mechanism adapted to be operated at the tripping of said lever, whereby said shifting-bar is thrown back to move the belt from the driving-pulley onto a loose pulley, and whereby said friction-brake is applied to said driving-pulley.

The invention consists, further, in specially-devised means, adapted to be operated by hand, to shift the belt from the loose pulley to the fixed pulley and to disengage said brake from the driving-pulley, and, further, in various details of construction and in combinations hereinafter described, and particularly pointed out in the claims.

My invention will be more readily understood by reference to the accompanying drawings, in which—

Figure 1 is a general view of an apparatus embodying my invention. Fig. 2 is a detail view showing the parts in one of their extreme positions. Figs. 3, 4, 5, 6, 7, and 8 are details. Fig. 9 is an enlarged side elevation of my apparatus.

As shown in the general figure, the power is applied through the main driving-pulley 2 on the shaft 3 to the belt 4, passing up and adapted to run over the loose pulley 5 or the fixed pulley 6 on the shaft 7, secured in the bearings 8, provided in the upright posts 9.

The worm 65 is secured on the shaft 7 and engages the large gear-wheel 66, secured on the shaft 10 of the oven-reel. The oven-reel is of the usual form, made up of the long arms or spokes 11, from the end of which the long shelves are hung, as shown.

The oven is of brick, and is about as broad as it is deep. The stamped cracker-dough is placed on the shelves as they are stopped on a level with the floor 13 of the oven-door by broad shovels or plates handled by the operator. The time consumed in one revolution of the reel is calculated as just sufficient to bake the crackers. After the crackers are baked they are raked off of the shelf and down into a suitable receptacle.

As shown in Fig. 1, the brake 14 is in engagement with the fixed pulley 6, so that the oven-reel is stationary. To start up the reel, this brake-shoe must be disengaged from the fixed pulley and the belt 4 shifted onto the same. This may be done by pulling on the handle 15 and throwing down the sector 16, to which the chain 17 is attached. In so doing said chain is pulled down and drawn over the pulleys or loose sheaves 18, secured on the frame of the oven. The other end of the chain 17 is secured at the free end of the weight-lever 19, provided with the weight 20 and pivoted on a stud 21. The end of this lever is loosely engaged by the curved guide strip or strips 22, to prevent the same from getting out of line. A link 23 (shown clearly in the detail figures) is pivoted by a bolt 24 to the lever 19. The pivoted end of the lever 19 is provided with a slotted depending arm 25, adapted to engage the pin 26 in the shifter-rod 27, adapted to move longitudinally through suitable bearings 28, and having a staple or shifter-pin 29, adapted to engage opposite sides or edges of the power-belt 4. As shown, the brake-shoe 14 is carried on a long lever 30, pivoted at a point 31 near the brake-shoe 14. The end of the long arm of this lever 30 extends through the link 23, dependingly hung from the weight arm or lever 19. When the handle 15 is thrown up and the weight-arm raised, the link 23 is pulled up and engages the outer end of the brake-arm, drawing the same up a short distance and thereby releasing the brake from the fixed pulley. At the same time the arm 25, provided with the slot 33, is moved forward, thus forcing back the shifter-rod and throwing the belt 4 onto the fixed pulley 6, thereby starting up the oven-reel. The rear end of the shifter-rod 27 is provided with a depending pivot-lug 34, which, when the shifter-rod is forced back, engages with the top of the weighted arm 35 of the releasing-lever 36, pivoted on the plate 37 at 38. When the shifter-rod is pushed back, the notch 39 therein engages with the block or catch 40, provided on the plate 37, and is therefore held back, thereby preventing the weight-arm from falling down to apply the brake and shift the belt. Each of the spokes, or rather the cracker-shelves, are represented by a releasing-pin 41, provided on the gear 66, and in position to engage the lower end of the lever 36 as the gear is rotated in the direction of the arrow in Fig. 1. Suppose the weight-arm to be in the position shown in Fig. 2, the lug 34 would then be in engagement with the roughened top of the releasing-lever. Now, as the belt is upon the driving-pulley the oven-reel and the gear 66 will be in motion and one of the pins 40 will soon be brought into engagement with the lever 36 as the shelf 12 is nearing the level of the floor of the doorway. The end 35 of the releasing-lever would then be thrown up, thus forcing the end of the shifter-rod upward and disengaging the end of the notch 39 from the stop 40, whereupon, its support being taken away, the weight-arm would fall to throw the rod 27 back and shift the belt, and, by means of a pin 45 in the link 23, engage the brake-lever to force the brake-shoe tightly against the fixed pulley on the worm-shaft 7. The arrangement may be such as to force this lever down by the engagement of the lever by the bottom of the adjustable weight 20. A set-screw 46 is provided in the weight 20, whereby the same may be secured at any point on the weight-arm. Extra holes may be provided in the link 23 for the bolt, by which it is pivoted on the weight-arm, so that by adjusting the length of the link the relative time of disengagement of the brake-shoe from the fixed pulley may be changed.

It is sometimes necessary to turn the reel back, and in order to permit its turning without breaking the lever 36 I provide the stout spring 47, adapted to press on the under side of the weighted portions 35 thereof, so that instead of having a rigid stop therefor a yielding but strong support is provided. The pins 41 are secured to the inner part of the gear 66, as shown in Figs. 5, 6, and 7, by means of two annular rings 69 and 48, held apart by sleeves 49, provided on the pin-bolts 40 and adapted to serve as guides for the lower end of the lever 36, extending between them.

In order that the stopping-points of the swinging shelves may be nicely determined and adjusted, I provide the slots 50 in these annular rings and in which the pin-bolts are secured. By moving the bolts one way or the other therein it will be seen that the automatic stop may be made to operate at just the time desired.

It is sometimes desirable to revolve the reel slowly in order that parts of it may be gotten at for repairs. This work is usually done at noon or at another time when power is shut off. Hence the reel must be turned around by hand by pulling down on the belt 4. Inasmuch as the brake was applied at the last stopping of the reel, at the time the last batch of crackers was taken out, before shutting down, it would be impossible to turn the reel without disengaging the brake-shoe from the fixed pulley. In order to accomplish this without moving the shifter-rod any considerable distance, I provide the notched rod 55, adapted to engage the plate 56, and by means of which the movement of the swinging lever 57 is controlled. In Fig. 2 this mechanism is shown as out of use and in such a position that it does not in any way interfere with the movement of the parts of the apparatus. The lever 57 is shown as thrown into perpendicular position and held there by the notched rod 55 to hold the brake-arm up in the position shown by the dotted lines, so that the brake-shoe is slightly removed from the under side of the fixed pulley 6. In thus moving up the rear ends of the brake-arm the weight and weight-arm would be raised a short distance, but not far enough to have any material effect upon the shifter-rod. After the repairing has been done the rod 55 will be pulled out, so as to leave the link 57 in the position shown in Fig. 3 and out of the way of the brake-arm, which would then fall down into its extreme lower position.

It is obvious that various modifications of the apparatus shown in the drawings would readily suggest themselves to one skilled in the art, and I therefore do not confine myself to the exact construction shown and described.

Having thus described my invention, I claim as new and desire to secure by Letters Patent—

1. The combination, in a device of the class described, of the worm-gear shaft, the oven-reel and the swinging shelves thereon with fixed and loose pulleys on said gear-shaft, a belt adapted to run over the same, a friction-brake adapted to engage the fixed pulley, a shifter-rod by means of which said belt may be shifted from one of said pulleys to the other, a bell-crank weight-arm adapted to engage said shifter-rod and the brake-arm, means for raising said weight-arm, and means adapted to be operated by the revolution of the reel-operating mechanism, whereby said weight-arm is released as a shelf nears the level of the discharge-table or oven-door floor, substantially as described.

2. The combination, in a device of the class described, of the oven-reel and shaft with the worm-gear and worm-shaft, loose and fixed pulleys thereon, a belt adapted to operate the same, a pivoted brake-arm, a friction brake-shoe provided thereon and adapted to frictionally engage said fixed pulley, a shifter-rod for said belt, a notch in said rod adapted to engage a suitable catch, pins on said gear, a pivoted releasing-lever with which said shifter-rod is adapted to engage, said pins or lugs adapted to engage said lever to throw said rod out of engagement with said lock or catch, a bell-crank weight-arm engaging said shifter-rod and having a link adapted to engage the brake-arm, and means for raising said brake-arm to disengage said brake from said pulley and to move said shifter-rod to shift said belt into engagement with said releasing-lever, substantially as described.

3. The combination, in a device of the class described, of the oven-reel-operating mechanism with the fixed pulley and the loose pulley, the belt, the brake-arm, the brake-shoe thereon adapted to frictionally engage said fixed pulley, the shifter-rod, the weight-arm having the depending slotted arm engaging said shifter-rod, the link provided in connection with said weight-arm and adapted to engage said brake-arm, the catch adapted to engage said shifter-rod when it is forced back, the pivoted releasing-lever adapted to engage the rear end of said shifter-rod when in said position, and adjustable pins or bolts provided in connection with the oven-operating mechanism and adapted to engage said releasing-lever, substantially as described.

4. The combination, in a device of the class described, of the gear-wheel with the worm and worm-gear shaft, a loose and a fixed pulley on said shaft, the brake-arm pivoted at 31 and provided with the brake-shoe 14, adapted to frictionally engage the fixed pulley 6, the bell-crank weight-arm provided with a weight 20 and having the slotted arm 25, the shifter-rod 27, having lugs adapted to engage the belt 4, passing over said pulleys, the bolt or pin 26 on said shifter-rod, extending into the slot on said rod 25, the link 23, pivoted on the arm 19 of the bell-crank weight-arm and adapted to engage the end of the brake-arm opposite the end on which the brake 2 is secured, means for raising said weight-arm, and means for automatically tripping said shifter-rod, whereby said weight-arm is allowed to fall to apply said brake to the fixed pulley, substantially as described.

5. The combination, in a device of the class described, of the shifter-rod 27, adapted to move longitudinally in suitable bearings, the gear-wheel, the worm and worm-shaft, a fixed and a loose pulley thereon, the belt 4, pins or lugs projecting from said gear-wheel and corresponding in position and number to the shelves or pans of the oven-reel, the pivoted lever 36, adapted to engage the end of the shifter-rod when the same is pushed back, the shoulder or lug 40, the shoulder 39 of the shifter-rod, adapted to engage the same, the brake-arm pivoted at 31 and provided with the brake-shoe 14, the bell-crank consisting of the weight-arm 19, having the weight 20 and the arm 25, provided in the slot 33, a lug or bolt extending from said shifter-rod in said slot, the link 23, and means for raising the arm 19, substantially as described.

6. The combination of the bell-crank, weight arm or lever provided with an adjustable weight 20, the brake-arm, the link 23, the sheaves 18, the chain 17, passing over the same from said weight-lever, the movable sector 16, and a guide 22 for the free end of said weight-lever, substantially as described.

7. The combination, with the fixed and loose pulleys of the worm-shaft, of the belt 4, the brake-arm and brake-shoe provided thereon, the weight-lever adapted to operate in connection therewith, and the pivoted lever 57, adapted to engage said brake-arm to disengage the shoe 14 from the fixed pulley, and the rod 55 for operating said lever 57, substantially as described.

8. The combination of the gear-wheel with the worm and worm-gear shaft, the shifter-rod, the brake mechanism provided in connection therewith and adapted to engage the fixed pulley on the worm-shaft, the lever 36, the ring or rings having slots 50 and secured upon said gear-wheel, and the bolts 41, provided in said slot and adapted to be locked in position therein, substantially as described.

In testimony whereof I have hereunto set my hand this 19th day of December, 1890.

PETER G. FORSBERG.

In presence of—
BESSIE BOOTH,
O. G. HAWLEY.